United States Patent [19]
Brick

[11] Patent Number: 4,734,983
[45] Date of Patent: Apr. 5, 1988

[54] CUTTING TOOL HAVING SINGLE MOVING BLADE

[76] Inventor: Francis M. Brick, 3242 Lenape Dr., Dresher, Pa. 19025

[21] Appl. No.: 903,646

[22] Filed: Sep. 4, 1986

[51] Int. Cl.⁴ .............................................. B26B 15/00
[52] U.S. Cl. ......................................... 30/228; 30/249
[58] Field of Search ................. 30/180, 190, 210, 216, 30/228, 249

[56] References Cited

U.S. PATENT DOCUMENTS

| | | | |
|---|---|---|---|
| 3,039,189 | 6/1962 | McBerty | 30/245 |
| 3,165,780 | 1/1965 | Kellersman et al. | 30/228 |
| 3,533,162 | 10/1970 | Pacitti | 30/260 |
| 3,819,153 | 6/1974 | Hurst | 254/93 |
| 3,971,131 | 7/1976 | Boyajian | 30/260 |
| 4,333,330 | 6/1982 | Porter | 72/392 |
| 4,359,821 | 11/1982 | Pellenc | 30/228 |
| 4,392,263 | 7/1983 | Amoroso | 7/100 |
| 4,531,289 | 7/1985 | Brick | 30/134 |

OTHER PUBLICATIONS

Lukas American—Model 25b—Spreader and Cutter.

*Primary Examiner*—Douglas D. Watts
*Attorney, Agent, or Firm*—William H. Eilberg

[57] ABSTRACT

The invention is a high-power portable cutting tool which is particularly effective in cutting through sheet metal. The tool can thus be used for extricating accident victims from wreckage. The tool is operated by hydraulic power, and has one movable blade and one stationary blade. The movable blade is curved, and is mounted so as to close onto the stationary blade. The curvature of the movable blade is such that its initial contact with the stationary blade occurs at its free end. The stationary blade is formed on an anvil, anchored within the frame of the tool. The anvil is sufficiently long that its end extends beyond the end of the movable blade. The anvil is anchored within a slot formed in the cover portion of the frame, and is locked into position with a dowel. The mounting of the anvil within the slot is such that the forces exerted on the blade are directed against the heavy cover, and not against the dowel.

19 Claims, 2 Drawing Sheets

4,734,983

CUTTING TOOL HAVING SINGLE MOVING BLADE

BACKGROUND OF THE INVENTION

This invention is a high-powered, portable, hydraulic cutter. It is especially suited for use as a rescue tool, as it is capable of cutting through sheet metal and can thereby extricate victims from the wreckage of accidents. But the invention can also be used for other purposes.

One example of a rescue tool of the prior art is shown in my U.S. Pat. No. 4,531,289. The latter patent shows a hydraulically-operated tool having two cutting blades which open and close upon each other. Another example of a rescue tools having two moving blades is given in U.S. Pat. No. 4,392,263.

The cutters of the prior art, which have two moving blades, are most effective in snapping metallic cables or posts, and in performing other tasks which require only one stroke. But when it is necessary to cut through sheet metal, such as the body of a wrecked automobile, many cutting strokes are needed, and the cutters of the prior art perform poorly. While a cutter having two moving blades can easily make an initial cut in a piece of sheet metal, it is very difficult to make subsequent cuts. The moving blades are joined together at a boss, and the boss prevents the tool from being inserted into an existing cut. In making the second cut through the sheet metal, it is therefore necessary to insert one of the blades through the first cut, from above or below the surface of the metal. Inserting the blade in this manner invariably places the tool in an awkward position, and causes the whole tool to rotate when the blades are pushed together. Any subsequent cut is usually no more than a small "nibble", compared with the length of the initial cut. In an emergency situation, it is important that each cut be as long as possible, so that the tool can cut through the piece of sheet metal as quickly as possible.

When the tool has two moving blades, an equal amount of force must be applied to both blades. The metal is thus cut with equal force from both sides, and will therefore be kept centered while being cut. With two moving blades, the force generated by the hydraulic system must be split between the two blades. This requirement means that the piston and the hydraulic cylinder must be quite large. The cutters of the prior art therefore must be capable of developing a larger amount of power, to develop the same cutting force.

Another disadvantage of cutters having two moving blades is that the blades must be opened fully before removing them from the material being cut. Opening the blades fully consumes additional time, which is precious in a rescue context.

The present invention solves the problems described above with a practical cutting tool having a single moving blade. This single blade cutter allows a second, or continuing, cut to be made easily, due to the structure of the stationary blade. By concentrating the power of the hydraulic system on a single moving blade, it is possible to reduce the area of the piston by about 50%, while maintaining the same output force. This reduction of piston size reduces the overall volume and weight of the entire tool, making it easier to carry and easier to manipulate. The present invention is therefore especially useful in an emergency.

SUMMARY OF THE INVENTION

The cutting tool of the present invention is mounted on a frame having a heavy cover. The cover is preferably of metal, and is sufficiently strong to absorb the large forces generated during the cutting operation. An anvil, defining a stationary blade, is inserted within a slot in the cover. A movable cutting blade is affixed to the anvil, and can pivot with respect to the anvil. A link connects the movable blade to a source of hydraulic power.

The movable blade is curved, such that when the blade is moved towards the anvil, its outer tip makes the initial contact with the anvil. Thus, all of the cutting force is concentrated on only one point at one time. The anvil is sufficiently long that its end extends beyond the tip of the moving blade.

The anvil is held in the slot by a dowel. The dowel rests inside a hole having a diameter slightly larger than that of the dowel. The dowel prevents the anvil from sliding out of the cover, but does not itself bear a load from the anvil while the tool is being used. Instead, the forces exerted on the anvil are transmitted to the cover only.

In one embodiment, the side walls of the slot extend continuously through the slot, and are inclined at an acute angle from the perpendicular to the cover. In another embodiment, the side walls of the slot form a "step" pattern, defining two discontinuous sections. In the latter embodiment, the base of the anvil is formed with a hook portion which rests within the lower section of the slot.

In both embodiments, the tool is powered by a hydraulically-operated piston. The cylinder containing the piston is sealed by a pair of plugs, preferably made of hard plastic. The plugs rest firmly against the cylinder walls, and act as back-up seals for the hydraulic system. The metal cutting parts can therefore be removed and replaced without affecting the integrity of the hydraulic systems.

It is therefore an object of the invention to provide a high-powered, portable cutting tool having a single moving blade.

It is another object to provide a tool which can easily and rapidly cut through sheet metal.

It is another object to provide a cutting tool which can perform cutting operations requiring several cutting strokes, as well as operations requiring only one stroke.

It is another object to provide a rescue tool which saves time in extricating accident victims from wreckage.

It is another object to provide a tool as described above, wherein the size of the hydraulic piston, and its associated components, is minimized.

It is another object to provide a hydraulically-operated cutting tool having cutting blades which can be removed without affecting the integrity of the hydraulic system.

It is another object to provide a single-blade cutting tool as described above, wherein the forces exerted on the stationary blade are absorbed by a heavy metal cover.

Other objects and advantages of the invention will be apparent to those skilled in the art, from a reading of the following brief description of the drawings, the detailed description of the invention, and the appended claims.

DETAILED DESCRIPTION OF THE INVENTION

Figure 1:
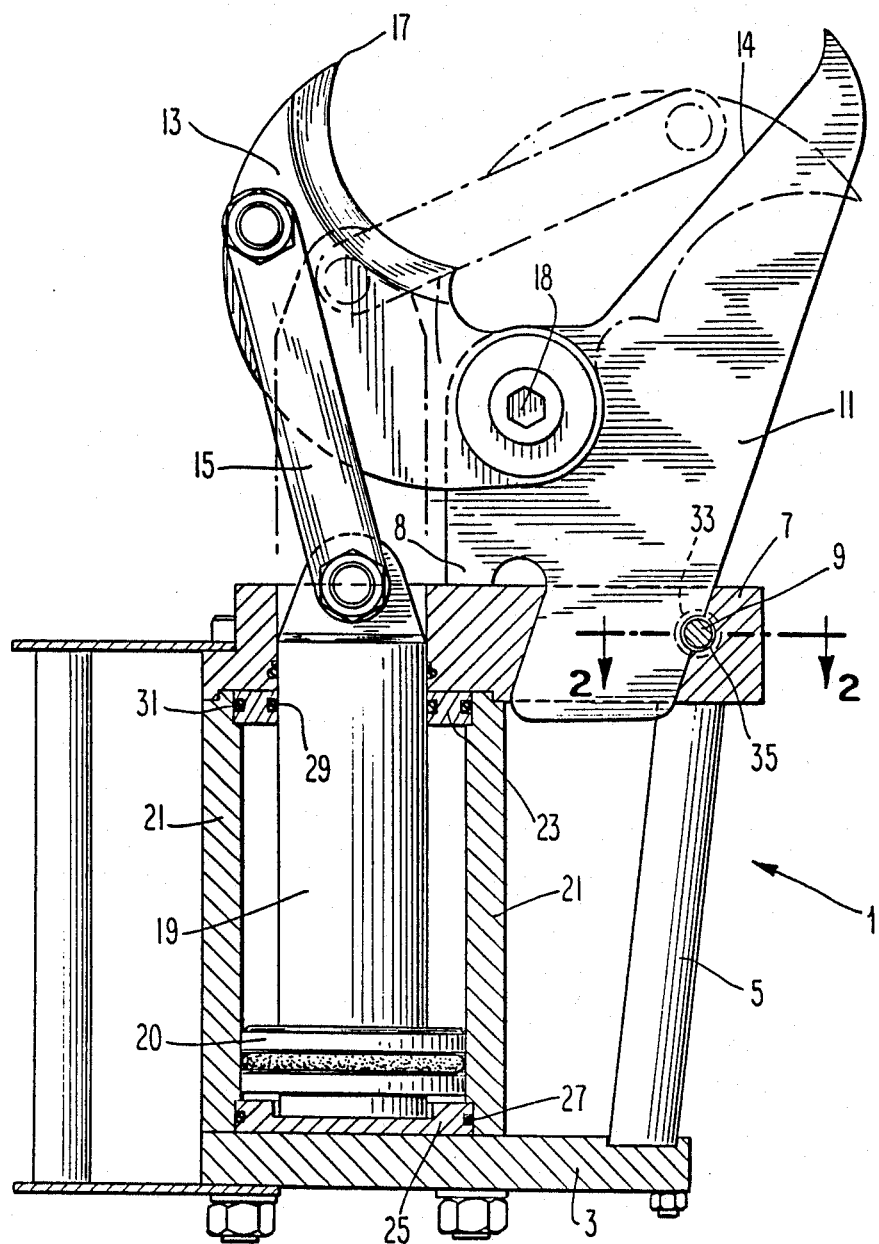
FIG. 1 is a view of the tool of the present invention, showing part of the frame in cross-section, and showing the cutting blades in side elevation.

FIG. 1 shows the preferred embodiment of the present invention. Cutting tool 1 has a frame which includes bottom piece 3, handle 5, and cover 7. Blade 13 is the single movable blade of the tool. The other blade 14 is stationary, and is formed on the surface of anvil 11. The base portion of anvil 11 is inserted in a slot in cover 7, and is locked within the slot by dowel 9. Dowel 9 sits within hole 35, which has a diameter slightly larger than that of the dowel. Cover 7 is preferably formed of metal, and should be of sufficient strength to withstand the substantialy forces exerted on anvil 11. The shape of the cover is not critical, as long as the cover is sufficiently large to receive the anvil, and to absorb the forces exerted on the anvil.

Blade 13 and anvil 11 are connected together by bolt 18, which allows blade 13 to pivot and engage the anvil, as shown in phantom in FIG. 1.

Blade 13 is moved by a hydraulic system which includes piston rod 19 and piston 20. The piston reciprocates within cylinder 21. The hydraulic system is actuated by a hand-operated valve, not shown in FIG. 1. Link 15 connects piston rod 19 to blade 13. Plugs 23 and 25 seal the top and bottom portions of the cylinder. These plugs are provided with back-up O-ring seals 27, 29, and 31. The plugs are distinct from the cylinder and the piston.

Plugs 23 and 25 are preferably made of plastic, such as an ultrahigh molecular weight (UHMW) polyurethane. The use of plastic, or similar compliant material, is preferred because the plug acts as a natural seal for the hydraulic system, and prevents hydraulic fluid from leaking if the back-up seals fail. In fact, by using plastic plugs, it is even possible to omit the back-up seals. However, the plugs could also be made of metal, in which case one would need to provide back-up seals. If metal plugs are used, the plugs must be precisely machined to fit in place.

Blade portion 14 of anvil 11 is substantially straight, and extends beyond the tip 17 of movable blade 13. FIG. 1 shows, in phantom, the movement of blade 13. Tip 17 initially contacts anvil 11 at a point along blade portion 14.

Movable blade 13 is curved, such that tip 17 is the only part of blade 13 which initially pierces the metal being cut. This curvature is necessary for practical considerations; all of the power of the hydraulic system is thus concentrated onto a single point, making it possible to cut very thick pieces of metal. If the curvature of blade 13 is reduced, the power required from the hydraulic system becomes greater, and it becomes more difficult to hold the tool while cutting. If the blade 13 were entirely straight, and not curved at all, it would be almost impossible to cut through sheet metal, as the blade would tend to be pushed away from the metal being cut, when the movable blade engages the anvil.

While it is necessary that blade 13 be curved, the amount of curvature must not be too great. For a given length of link 15, an excessively curved blade will not fully mesh with the anvil at all points, and a portion of the metal will remain uncut. It is important that the blades be fully meshed when the link is in its fully extended position, as shown in phantom. It is therefore necessary to provide a movable blade having some curvature, but not so much that the blades cannot fully mesh. The phantom drawing in FIG. 1 shows that the blades do mesh along their entire lengths, and all of the metal will be cut.

As shown in FIG. 1, anvil 11 is mounted in a slot in cover 7. The slot has walls which are generally straight and continuous, and which extend through the cover. The walls are generally parallel to each other, and are oblique relative to the cover. That is, the walls are slanted at an acute angle from the vertical, as shown.

The sole purpose of dowel 9 is to prevent anvil 11 from sliding out of the tool. Because of the clearance between hole 35 and dowel 9, the anvil cannot exert pressure on the dowel. Thus, the dowel does not absorb force from the anvil during the cutting operation. The pressure on the anvil is transmitted only to the cover, and not to the dowel. The dowel therefore serves only as a locking means, preventing outward movement of the anvil. Inward movement of the anvil is prevented by foot 8, which is formed as part of the anvil.

The clearance between hole 35 and the dowel thus serves two purposes. It facilitates the insertion of the dowel into the hole, and it also insures that the dowel does not bear any of the load intended to be supported by the cover.

The maximum force exerted on the dowel occurs when the angle made by the link, relative to the cover, is the same as the angle of inclination of the slot. At this point, if the dowel were not present, the anvil would slide out of the cover. But this force exerted on the dowel is relatively small. The dowel can therefore have a relatively small diameter, and will not break even when large forces are exerted on the anvil during the cutting operation.

Figure 2:
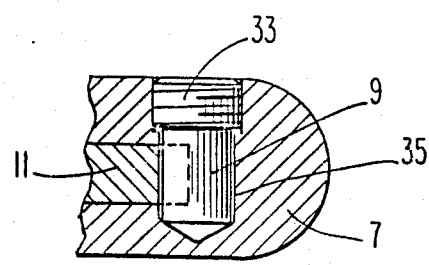
FIG. 2 is a cross-sectional view showing the mounting of the dowel, taken along the line 2—2 of FIG. 1.

FIG. 2 shows how dowel 9 is mounted in cover 7. The dowel is inserted into its hole, so as to prevent anvil 11 from sliding out. Then a threaded plug 33 is screwed in to retain the dowel in place. The plug 33 could be integrally formed with the dowel, or it could be a separate piece. Other means of holding the dowel can also be used.

Figure 3:
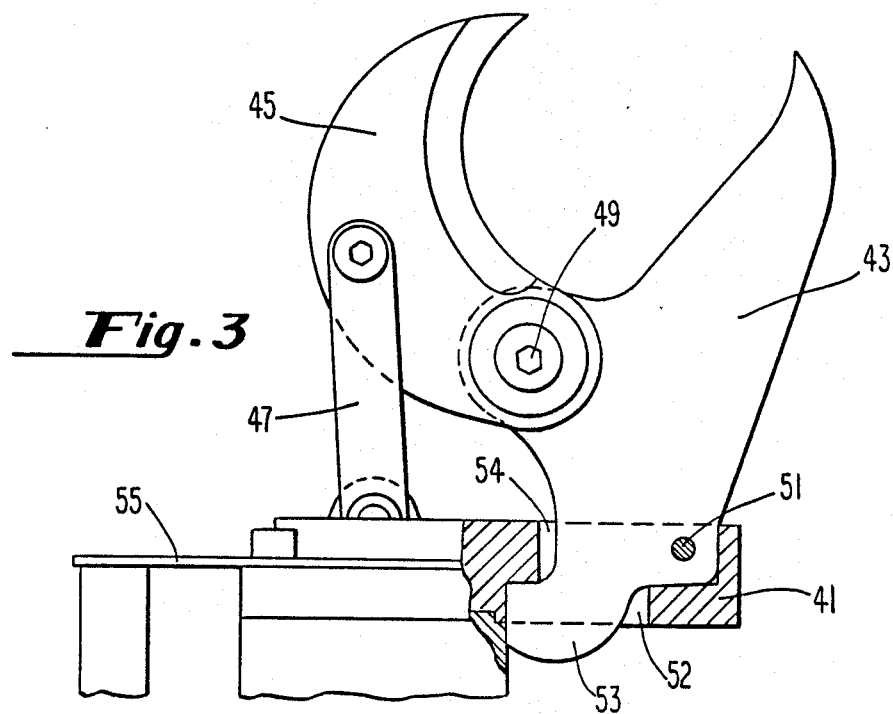
FIG. 3 is a fragmentary view, similar to FIG. 1, showing an alternative embodiment of the invention.

FIG. 3 shows an alternative embodiment of the invention. The hydraulic system is identical for both embodiments. Therefore, the details of the hydraulic system have not been repeated in FIG. 3. FIG. 3 shows movable blade 45 and anvil 43 bolted together by bolt 49. It also shows a fragment of frame 55, and cover 41. The movable blade is connected to its piston by link 47.

As in the first embodiment, the anvil is inserted into a slot in the cover. But, unlike the slot of FIG. 1, whose walls are substantially continuous, the walls of the slot in FIG. 3 form a "step" pattern, and define two discontinuous sections. The slot thus has an upper portion 54 and a lower portion 52. Anvil 43 is formed with a hook portion 53 which is inserted into the lower portion of the slot, as shown in FIG. 3. As in the first embodiment, the anvil is locked within the cover by a dowel, identified by reference numeral 51. It is understood that the dowel is mounted in a hole with a clearance, as in the embodiment of FIG. 1.

The structure shown in FIG. 3 performs similarly to that of FIG. 1. That is, the force exerted on the anvil, during the cutting operation, is transmitted to the cover, but is not exerted on the dowel.

Figure 4:
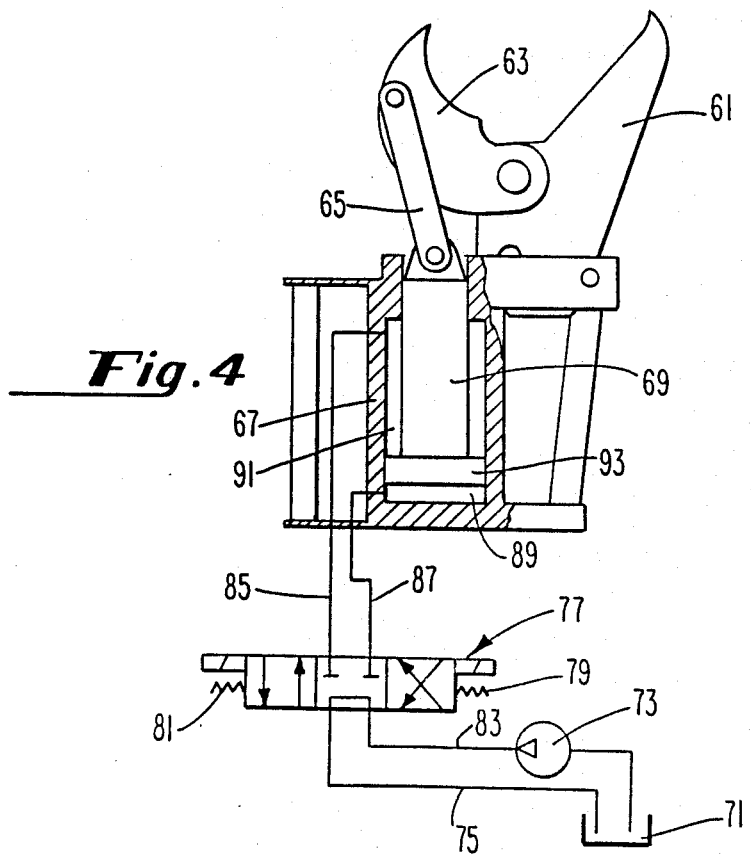
FIG. 4 is a schematic diagram of the hydraulic control system for the tool of the present invention.

FIG. 4 is a schematic diagram showing the operation of the hydraulic system. In FIG. 4, the cutting tool is shown symbolically. It is understood that the cutting tool in FIG. 4 could be constructed according to either embodiment described above. Visible in the figure are movable blade 63, anvil 61, and link 65 connecting blade 63 to piston rod 69. Piston 93 divides cylinder 67 into regions 89 and 91.

Valve 77 is hand-operated, and is preferably mounted on or near the handle of the tool. The valve is spring-biased, by spring 79, in its neutral position, as shown in the figure. The attachment of the valve to the handle is not specifically shown; the particular means of attachment is not part of this invention. The valve can also be operated by a solenoid. It is understood that the particular means by which the valve is actuated does not form a part of this invention.

When the valve is in the position shown in FIG. 4, pump 73 directs hydraulic fluid from the reservoir 71, through line 83, and back to the reservoir through line 75. When it is desired to make the blades come together, the valve is moved to the right, as shown in the figure. Pump 73 then directs hydraulic fluid through lines 83 and 87, and into region 89. At the same time, the fluid from region 91 is pushed out by the piston, through lines 85 and 75, and back to the reservoir. When it is desired to separate the blades, the valve is moved to the left, reversing the flow of fluid to regions 89 and 91. When no pressure is placed on the valve, springs 79 keep the valve in the neutral position shown, and the blade does not move.

In the present invention, the entire power output of the hydraulic system is concentrated on the one moving blade. It is not necessary to divide the power of the hydraulic system between two moving blades, as is necessary with the tools of the prior art. The result is that the power requirement, and therefore the size of the piston and associated components, can be about one-half that of cutting tools of the prior art. The use of a single moving blade thus makes the device more portable, and more easily maneuvered, than cutters having two moving blades. Clearly, portability and maneuverability are very important for a tool that will be used in an emergency.

The present invention is not limited to the cutting of sheet metal. It can also cut other metallic structures, such as heavy wires or posts, which are generally cut in one stroke. The advantage of the present invention is that it can do both types of cutting with ease.

The plastic plugs, described above, which seal the hydraulic system, enable the blade and anvil, as well as the cover, to be removed without affecting the integrity of the hydraulic system. The plastic plugs act as seals when pressed against the ends of the walls of the cylinder. This construction reduces the time necessary to service the tool, because the entire tool does not have to be disassembled when only the blade or anvil is to be replaced.

While the invention has been described with respect to two particular embodiments, it is understood that modifications may be made, within the scope of the invention. The particular shape of the anvil and blade can be varied; the anvil can be provided with a curved point at its end, as shown in FIG. 1, or it can be completely straight. The anvil blade itself could also be curved, as long as the dimensions of the moving blade and the link are chosen such that the blades engage fully. The curvature of the moving blade can be varied within the limits discussed above. It is also possible to design other shapes for the slot in the cover, in which the anvil is mounted, wherein the entire load on the anvil is supported by the cover. Also, the movable blade can be moved by means other than a hydraulic system. These and other similar modifications should be considered within the spirit and scope of the following claims.

What is claimed is:

1. A cutting tool having a single moving blade, comprising:
   (a) a frame, the frame including a cover portion, the cover portion having a slot, the slot having generally parallel walls which extend continuously and completely through the cover portion,
   (b) an anvil, the anvil including a first cutting blade, the anvil having a base portion inserted into the slot, the base portion of the anvil extending through the slot, and protruding beyond the cover portion,
   (c) dowel means, disposed in a hole formed by the base portion of the anvil and by the cover portion, the dowel means comprising means for locking the anvil within the cover portion,
   (d) a second cutting blade, the second blade being movable and being pivotably connected to the anvil, the second blade having a tip, wherein the end of the first blade extends beyond the tip of the second blade when the second blade is in engagement with the first blade, wherein the second blade is curved, and wherein the curvature of the second blade is such that the tip of the second blade is the initial part of the second blade to contact the first blade when the second blade is moved towards the first blade, and
   (e) hydraulic means, mounted in the frame, and connected to the second blade by a link, wherein the hydraulic means causes the second blade to open and close upon the anvil, and wherein the length of the link is selected such that the first and second blades are fully meshed when the link is pushed into its fully extended position,
   wherein the hydraulic means includes a cylinder and a piston, and wherein the ends of the cylinder are sealed by plug means, the plug means being distinct from the cylinder and from the piston, wherein the blades can be removed without removing the plugs, and wherein the blades can be removed without affecting the integrity of the hydraulic means.

2. The tool of claim 1, wherein the plug means comprise plastic plugs.

3. A cutting tool having a single moving blade, comprising:
   (a) a frame, the frame including a cover portion, the cover portion having a slot, the slot having generally parallel walls which extend continuously through the cover portion,
   (b) an anvil, the anvil including a first cutting blade, the anvil having a base portion inserted into the slot, the base portion of the anvil extending through the slot, and protruding beyond the cover portion, (c) dowel means, disposed in a hole formed by the base portion of the anvil and by the cover portion, the dowel means comprising means for locking the anvil within the cover portion, (d) a second cutting blade, the second blade being movable, the second blade being pivotally connected to the anvil, and (e) hydraulic means, mounted in the frame, and connected to the second blade, wherein the hydraulic means causes the second blade to open and close upon the anvil, wherein the second blade has a tip, and wherein the end of the first blade extends beyond the tip of the second blade when the second blade is in engagement with the first blade, wherein the second blade is curved, and wherein the curvature of the second blade is such that the tip of the second blade is the initial part of the second blade to contact the first blade when the second blade is moved towards the first blade, wherein a link connects the hydraulic means to the second blade, and wherein the length of the link is selected such that the first and second blades are fully meshed when the link is pushed into its fully extended position, and wherein the hydraulic means includes a cylinder and a piston, and wherein the ends of the cylinder are sealed by plug means, the plug means being distinct from the cylinder and from the piston, wherein the blades can be removed without removing the plugs, and wherein the blades can be removed without affecting the integrity of the hydraulic means.

4. The tool of claim 3, wherein the plug means comprise plastic plugs.

5. A cutting tool having a single moving blade, comprising:

(a) a frame, the frame including a cover portion, the cover portion having a slot, the slot having generally parallel walls which extend continuously through the cover portion, (b) an anvil, the anvil including a first cutting blade, the anvil having a base portion inserted into the slot, the base portion of the anvil extending through the slot, and protruding beyond the cover portion, (c) dowel means, disposed in a hole formed by the base portion of the anvil and by the cover portion, the dowel means comprising means for locking the anvil within the cover portion, (d) a second cutting blade, the second blade being movable, the second blade being pivotally connected to the anvil, and (e) hydraulic means, mounted in the frame, and connected to the second blade, wherein the hydraulic means causes the second blade to open and close upon the anvil, wherein the second blade has a tip, and wherein the end of the first blade extends beyond the tip of the second blade when the second blade is in engagement with the first blade, wherein the second blade is curved, and wherein the curvature of the second blade is such that the tip of the second blade is the initial part of the second blade to contact the first blade when the second blade is moved towards the first blade, wherein a link connects the hydraulic means to the second blade, and wherein the length of the link is selected such that the first and second blades are fully meshed when the link is pushed into its fully extended position, wherein the hole has a diameter larger than that of the dowel means, and wherein the anvil includes a foot means disposed to rest on the cover.

6. A cutting tool, comprising:

(a) a housing, (b) a first blade mounted in the housing, the first blade being stationary, the first blade having an end extending from the housing, the housing having a slot, the slot extending completely through the housing, the first blade being inserted into the slot, and extending through the slot, and protruding beyond the housing, (c) a second blade, pivotably connected to the first blade, wherein the second blade is disposed to pivot towards the first blade, the second blade having a curved cutting surface, the second blade having a tip, wherein the end of the first blade extends beyond the tip of the second blade when the second blade engages the first blade, (d) hydraulic means, disposed in the housing, for exerting force in both of two directions, and (e) means for linking the hydraulic means with the second blade, wherein the hydraulic means causes the second blade to open and close upon the first blade, wherein the housing includes a cover portion, the cover portion having a slot, the first blade being anchored in the slot by a locking means, wherein the cover portion is disposed to receive force exerted on the first blade during a cutting operation, wherein the locking means comprises a dowel, the dowel being inserted within a hole defined by the cover and by the anvil, the diameter of the hole being larger than that of the dowel, and wherein the slot has walls which forms a step pattern, the walls defining an upper and lower portion of the slot, and wherein the anvil has a hooked base portion which fits within the lower portion of the slot.

7. A cutting tool, comprising:

(a) a frame, the frame including a cover, the cover having a slot, the slot being defined by walls which are formed in a step pattern, the slot having an upper and lower portion, (b) an anvil, the anvil having a cutting blade portion and a hooked base portion, the hooked base portion being inserted into the lower portion of the slot, (c) dowel means extending through the anvil and through the cover, the dowel means comprising means for locking the anvil within the cover, (d) a movable cutting blade, the movable cutting blade being pivotably connected to the anvil, and (e) hydraulic means, mounted in the frame, and connected to the movable blade, wherein the hydraulic means causes the movable blade to open and close upon the anvil.

8. The tool of claim 7, wherein the movable blade has a tip, and wherein the end of the anvil extends beyond the tip of the movable blade when the movable blade is in engagement with the anvil.

9. The tool of claim 8, wherein the movable blade is curved, and wherein the curvature of the movable blade is such that the tip of the movable blade is the initial part of the movable blade to contact the anvil when the movable blade is moved towards the anvil.

10. The tool of claim 9, wherein a link connects the hydraulic means to the movable blade, and wherein the length of the link is selected such that the movable blade and the anvil are fully meshed when the link is pushed into its fully extended position.

11. The tool of claim 10, wherein the hydraulic means includes a cylinder and a piston, and wherein the ends of the cylinder are sealed by plug means, the plug means being distinct from the cylinder and from the piston, wherein the blades can be removed without removing the plugs, and wherein the blades can thereby be removed without affecting the integrity of the hydraulic means.

12. The tool of claim 11, wherein the plug means comprise plastic plugs.

13. The tool of claim 10, wherein the hole has a diameter larger than that of the dowel means.

14. A cutting tool having a single moving blade, comprising:
   (a) a frame, the frame including a cover portion, the cover portion having a slot, the slot having generally parallel walls which extend continuously through the cover portion, the walls being oblique relative to the cover portion,
   (b) an anvil, the anvil including a first cutting blade, the anvil having a base portion inserted into the slot,
   (c) dowel means, disposed in a hole formed by the base portion of the anvil and by the cover portion, the dowel means comprising means for locking the anvil within the cover portion,
   (d) a second cutting blade, the second blade being movable and being pivotably connected to the anvil, the second blade having a tip, wherein the end of the first blade extends beyond the tip of the second blade when the second blade is in engagement with the first blade, wherein the second blade is curved, and wherein the curvature of the second blade is such that the tip of the second blade is the initial part of the second blade to contact the first blade when the second blade is moved towards the first blade, and
   (e) hydraulic means, mounted in the frame, and connected to the second blade by a link, wherein the hydraulic means causes the second blade to open and close upon the anvil, and wherein the length of the link is selected such that the first and second blades are fully meshed when the link is pushed into its fully extended position,
   wherein the hydraulic means includes a cylinder and a piston, and wherein the ends of the cylinder are sealed by plug means, the plug means being distinct from the cylinder and from the piston, wherein the blades can be removed without removing the plugs, and wherein the blades can be removed without affecting the integrity of the hydraulic means.

15. The tool of claim 14, wherein the plug means comprise plastic plugs.

16. A cutting tool having a single moving blade, comprising:
   (a) a frame, the frame including a cover portion, the cover portion having a slot, the slot having generally parallel walls which extend continuously through the cover portion, the walls being oblique relative to the cover portion,
   (b) an anvil, the anvil including a first cutting blade, the anvil having a base portion inserted into the slot,
   (c) dowel means, disposed in a hole formed by the base portion of the anvil and by the cover portion, the dowel means comprising means for locking the anvil within the cover portion,
   (d) a second cutting blade, the second blade being movable, the second blade being pivotably connected to the anvil, and
   (e) hydraulic means, mounted in the frame, and connected to the second blade, wherein the hydraulic means causes the second blade to open and close upon the anvil,
   wherein the second blade has a tip, wherein the end of the first blade extends beyond the tip of the second blade when the second blade is in engagement with the first blade, wherein the second blade is curved, wherein the curvature of the second blade is such that the tip of the second blade is the initial part of the second blade to contact the first blade when the second blade is moved towards the first blade, wherein a link connects the hydraulic means to the second blade, wherein the length of the link is selected such that the first and second blades are fully meshed when the link is pushed into its fully extended position, wherein the hydraulic means includes a cylinder and a piston, and wherein the ends of the cylinder are sealed by plug means, the plug means being distinct from the cylinder and from the piston, wherein the blades can be removed without removing the plugs, and wherein the blades can be removed without affecting the integrity of the hydraulic means.

17. The tool of claim 16, wherein the plug means comprise plastic plugs.

18. A cutting tool having a single moving blade, comprising:
   (a) a frame, the frame including a cover portion, the cover portion having a slot, the slot having generally parallel walls which extend continuously through the cover portion, the walls being oblique relative to the cover portion,
   (b) an anvil, the anvil including a first cutting blade, the anvil having a base portion inserted into the slot,
   (c) dowel means, disposed in a hole formed by the base portion of the anvil and by the cover portion, the dowel means comprising means for locking the anvil within the cover portion,
   (d) a second cutting blade, the second blade being movable, the second blade being pivotably connected to the anvil, and
   (e) hydraulic means, mounted in the frame, and connected to the second blade, wherein the hydraulic means causes the second blade to open and close upon the anvil,
   wherein the second blade has a tip, wherein the end of the first blade extends beyond the tip of the second blade when the second blade is in engagement with the first blade, wherein the second blade is curved, wherein the curvature of the second blade is such that the tip of the second blade is the initial part of the second blade to contact the first blade when the second blade is moved towards the first blade, wherein a link connects the hydraulic means to the second blade, wherein the length of the link is selected such that the first and second blades are fully meshed when the link is pushed into its fully extended position, wherein the hole has a diameter larger than that of the dowel means, and wherein the anvil includes a foot means disposed to rest on the cover.

19. A cutting tool, comprising:
(a) a housing,
(b) a first blade mounted in the housing, the first blade being stationary, the first blade having an end extending from the housing,
(c) a second blade, pivotably connected to the first blade, wherein the second blade is disposed to pivot towards the first blade, the second blade having a curved cutting surface, the second blade having a tip, wherein the end of the first blade extends beyond the tip of the second blade when the second blade engages the first blade,
(d) hydraulic means, disposed in the housing, for exerting force in both of two directions, and
(e) means for linking the hydraulic means with the second blade, wherein the hydraulic means causes the second blade to open and close upon the first blade,
wherein the housing includes a cover portion, the cover portion having a slot, the first blade being anchored in the slot by a locking means, wherein the cover portion is disposed to receive force exerted on the first blade during a cutting operation, wherein the locking means comprises a dowel, the dowel being inserted within a hole defined by the cover and by the anvil, the diameter of the hole being larger than that of the dowel, wherein the slot has walls which form a step pattern, the walls defining an upper and lower portion of the slot, and wherein the anvil has a hooked base portion which fits within the lower portion of the slot.

* * * * *